S. P. Castle,
Stump Elevator,
No 19,070. Patented Jan. 12, 1858.
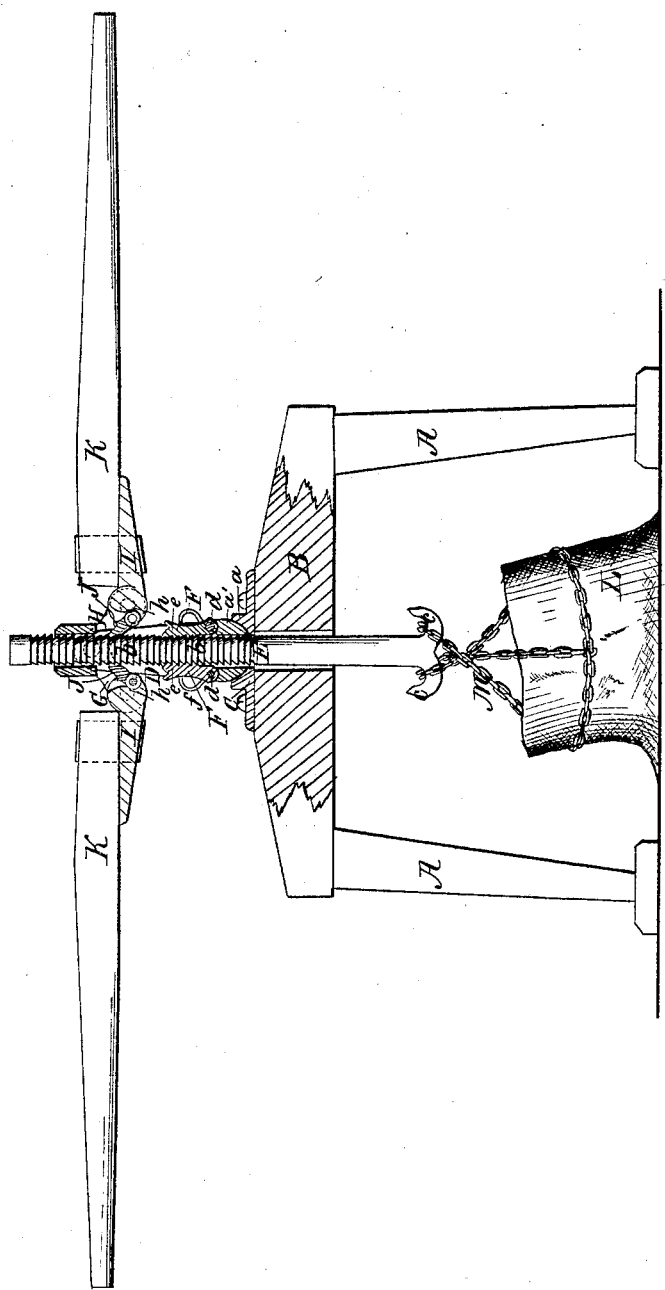
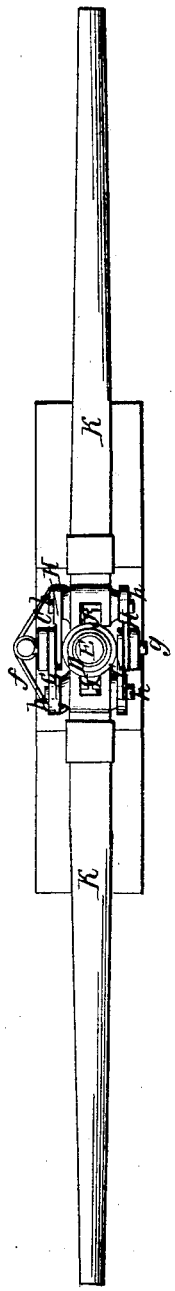

UNITED STATES PATENT OFFICE.

S. P. CASTLE, OF URBANA, OHIO.

STUMP-EXTRACTOR.

Specification of Letters Patent No. 19,070, dated January 12, 1858.

*To all whom it may concern:*

Be it known that I, S. P. CASTLE, of Urbana, in the county of Champaign and State of Ohio, have invented a new and Improved Machine for Extracting the Stumps of Trees; and I do hereby declare that the following is a full, clear, and exact description of the same, reference being had to the annexed drawings, making a part of this specification, in which—

Figure 1, is a vertical central section of my improvement. Fig. 2, is a plan or top view of ditto.

Similar letters of reference indicate corresponding parts in the two figures.

This invention consists in the employment or use of a cylindrical rack fitted within a proper socket and used in connection with lifting and retaining pawls, the above parts being arranged and applied to a suitable framing as hereinafter shown, whereby a strong durable and efficient machine is obtained, and one that will transmit with the least possible degree of friction the applied power to the extraction of the stump.

To enable those skilled in the art to fully understand and construct my invention I will proceed to describe it.

A, A, represent two uprights the upper ends of which are connected by a cross-tie B, and C, is a metallic plate which is bolted to the center of the upper surface of said cross-tie. This plate B has a concave of a semi-spherical form made in its upper surface and the lower of a socket D is fitted therein. This socket is made of metal and its lower end ($a'$) which fits in the concave ($a$) corresponds inversely in form with said concave as shown plainly in Fig. 1. Within the socket D, a cylindrical rack E is placed. This rack is formed by having grooves cut circumferentially in the rod so as to form annular teeth ($b$) as shown clearly in Fig. 1. The rack E extends entirely through the socket and also through the plate C and cross-tie B, the hole in the cross-tie being of sufficient diameter to allow a certain degree of play to the rack. The lower end of the rack has hooks ($c$) ($c$) formed on it.

F, F, represent two pawls which are fitted in the socket D at opposite sides of the rack E. These pawls are pivoted in the socket at their lower ends as shown at ($d$) and their face sides are provided with teeth ($e$) which are made to catch or fit between the teeth of the rack E by means of a spring ($f$). The pivots ($d$) of the pawls project beyond the socket at one side and are curved or bent upward to form levers so that the pawls F may be disengaged from the rack when necessary. The pawls F are retaining or holding pawls as they sustain or hold up the rack.

G, G, H, H, represent arms the inner ends of which are fitted on axes ($g$) ($g$) attached to the socket. One pair of arms G, G, are at one side of the socket and the other pair H, H, at the opposite side. Between the outer ends of each pair of arms the axis of a metal bar I, is fitted and in the inner end of each bar a pawl J, is pivoted as shown at ($h$) the pivots passing through the lower ends of the pawls as plainly shown in Fig. 1. The pawls J, are constructed similarly to the retaining or holding pawls F, F. To each bar I a lever K, is attached.

The operation is as follows: The uprights A, A, are placed at opposite sides, the stump L to be extracted and a chain M is placed around the stump and over the hooks (O) of the rack E. The levers K are then operated and as their outer ends are depressed the pawls J will be forced upward and act upon the rack E, the pawls F holding the rack while the pawls J, are moved downward for the succeeding upward stroke. By this means the stump L is extracted. The rack E, is let down by rasing the arms G, H, and thus freeing the rack from the pawls J, J, and also throwing back the retaining pawls F, F.

By the above arrangement it will be seen that the rack E may turn independently of the socket, and consequently the socket and its pawls may turn independently of the rack either being allowed to turn without at all affecting the proper action of the other. The socket is also with the rack allowed a certain degree of lateral play on account of the socket being fitted in the plate C as shown so as to form a ball and socket joint, none of the working parts therefore will be subjected to any undue strain as the rack is allowed to adjust itself or move in positions in accordance with the forces that may act upon it and the socket is also allowed a requisite degre of play for the same purpose. This independent movement of the parts is an important feature in the invention for as the stump is loosened in the soil it most generally turns or is canted to one side, as one part or side of the roots become detached before the other and if the rack and socket were not allowed to move or yield laterally they would be subjected to a great lateral strain. The pawls J, in consequence of being pivoted to the levers K and said levers being pivoted to the arms G, G, H, H, connected to the socket D as shown, are allowed to act upon the rack in a proper manner and without danger of breaking or injuring the teeth of the rack. The implement is therefore rendered extremely strong and efficient and but little power is lost by friction.

I do not claim broadly and irrespective of construction and arrangement the employment or use of a rack and pawls for extracting the stumps of trees, for this is a well known mechanical device and has been previously used for similar or analogous purposes; but,

Having thus described my invention what I claim as new and desire to secure by Letters Patent, is,

The annular rack E, placed within the socket D the lower end of which is fitted in the plate C, on the cross-tie B so as to form a ball and socket joint or connection therewith, the above parts being used in connection with the lifting and retaining pawls J, J, F, F, and the whole arranged substantially as and for the purpose set forth.

S. P. CASTLE.

Witnesses:
WILLIAM PATRICK,
E. L. SMALL.